United States Patent
Erban (10) Patent No.: US 6,493,622 B1
(45) Date of Patent: Dec. 10, 2002

(54) METHOD AND DEVICE FOR PROTECTING THE DIFFERENTIALS OF A MOTOR VEHICLE

(75) Inventor: Andreas Erban, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/868,373

(22) PCT Filed: Aug. 12, 2000

(86) PCT No.: PCT/DE00/02733

§ 371 (c)(1),
(2), (4) Date: Oct. 4, 2001

(87) PCT Pub. No.: WO01/28802

PCT Pub. Date: Apr. 26, 2001

(30) Foreign Application Priority Data

Oct. 16, 1999 (DE) .......................................... 199 50 035

(51) Int. Cl.[7] .......................... B60K 17/356; B60K 28/16
(52) U.S. Cl. ............................. 701/84; 701/85; 701/89; 701/81; 180/197; 180/248; 303/145
(58) Field of Search ............................. 701/84, 83, 85, 701/86, 89, 81, 74, 51, 61; 180/197, 244, 248; 303/145

(56) References Cited

U.S. PATENT DOCUMENTS

| 3,894,446 A | * | 7/1975 | Snoy et al. ................... 74/711 |
|---|---|---|---|
| 4,554,833 A | * | 11/1985 | Goebel ........................ 73/457 |
| 5,016,724 A | * | 5/1991 | Steinhagen et al. ......... 180/197 |
| 5,850,616 A | | 12/1998 | Matsuura et al. ............. 701/82 |
| 5,978,726 A | * | 11/1999 | Takeda et al. ................ 701/84 |
| 6,059,065 A | * | 5/2000 | Takeda et al. .............. 701/244 |
| 6,205,386 B1 | * | 3/2001 | Stroh et al. .................. 701/51 |

FOREIGN PATENT DOCUMENTS

| DE | 34 21 776 | 12/1984 |
|---|---|---|
| DE | 198 37 521 | 2/2000 |
| EP | 0 321 894 | 6/1989 |
| EP | 474064 B | * 4/1995 |

* cited by examiner

Primary Examiner—William A. Cuchlinski, Jr.
Assistant Examiner—Tuan C To
(74) Attorney, Agent, or Firm—Kenyon & Kenyon (57) ABSTRACT

The present invention relates to a method and a device for adjusting the output torque or the output speed of an internal combustion engine in order to protect the differentials. The crux and advantage of the present invention lies in calculating and monitoring the rpm differences or the rpm differences in the transverse direction of any vehicle (front-wheel-, rear-wheel-, and four-wheel-drive) as well as the difference in the Cardan speeds that exists in the longitudinal direction in four-wheel drive vehicles. When a specifiable limiting value is exceeded, an automatic reduction in the drive torque or an automatic limiting of the engine speed to a manageable level takes place. This protective function for the differentials cannot be switched off and is available even in the passively activated drive-torque AMR control system. It can only be realized by software using already existing sensors and actuator devices. The application outlay is minimal.

12 Claims, 4 Drawing Sheets

METHOD AND DEVICE FOR PROTECTING THE DIFFERENTIALS OF A MOTOR VEHICLE

BACKGROUND INFORMATION

The present invention relates to a method and a device for adjusting the braking action on the wheels of a vehicle, having the features of the preamble of the independent claims.

For transmitting the engine output torque to the drive wheels, so-called equalizing gears, or differentials, are known from the related art. They function primarily to equalize the rpm differences between the driven wheels of one axle, for example during cornering. In this context, a mechanical differential, a so-called transverse differential, is usually assigned to one drive axle.

If more than one axle is driven, for example in four-wheel-drive motor vehicles, then a further differential (center differential) is additionally present, primarily so that rpm differences between the driven axles are equalized.

Mechanical differentials, however, can only to a limited extent equalize the rpm differences between the left and right wheels, or between the rear and front axles. If the rpm differences exceed a critical limiting value, then the differential (and the tire) is destroyed by the excessive centrifugal force. The vehicle can no longer be driven and the result is an expensive repair of the affected parts.

For cost reasons, four-wheel-drive motor vehicles are increasingly equipped with open differentials. By way of example, in order to be able to transfer a drive torque in one spinning wheel of an axle to the other wheel of the axle, especially in off-road vehicles, differentials are used that can be mechanically locked. Similarly, the center differential can be designed so as to be lockable, so that even in the case of two spinning wheels on one axle a drive torque can become effective on the other axle.

However, this locking function, in so-called open differentials that are designed so as not to be mechanically lockable, can also be realized by a controlled, one-sided braking engagement (BMR, braking torque control), and in four-wheel-drive motor vehicles also by an axle-based braking engagement. The spinning wheel, or wheels, of one axle can be braked in a controlled, or wheel-specific, manner.

Precisely in four-wheel-drive motor vehicles having open differentials, however, the differentials can be damaged very quickly if three wheels are standing still (e.g., on asphalt) and only one wheel is situated on a sheet of ice (or "is hanging in the air") and the driver has caused the engine to "race" in the engaged state. If the one-sided braking engagement does not now provide for a braking of this wheel, then the entire drive torque acts on this one wheel in an accelerating manner. In this context, the engine/wheel speed ratio is twice as high as in a vehicle having a conventional drive. An individual wheel, in this context, can be accelerated within one second to several hundred km/h. This happens especially when faulty gear changing also occurs on the part of the automatic transmission. As a result of these enormous centrifugal forces, the tire can be destroyed or at least suffer structural damage so that later a blowout of the tire can result with fatal consequences.

Even if the differentials used are constructed in a mechanically robust manner and endure very high rpm differences at least for short periods, the stability of the tires is a serious subject. This is so especially in the case of off-road tires, which are in any case not designed for very high driving speeds.

The objective of the present invention lies in assuring an effective protection of differentials and tires, using simple means.

This objective is achieved by the characterizing features of the independent claims.

ADVANTAGES OF THE INVENTION

The present invention in a first variant relates to a method and a device for adjusting the output torque of an internal combustion engine in a motor vehicle having at least four wheels that are arranged on at least two axles and that are driven by the internal combustion engine.

For transmitting the drive, at least one transverse differential is provided that is assigned to an axle having driven wheels, and a center differential, that is assigned to two axles having driven wheels. For the driven case of the vehicle, a deactivatable, wheel-specific control system (BMR) for the braking action on the wheels and/or a control system (AMR) for the output torque of the internal combustion engine is provided. The crux of the present invention lies in the fact that, in a deactivated, wheel-specific control system for the braking action and/or control system for the output torque of the internal combustion engine

- rpm quantities are measured which represent the rotational motions of the vehicle wheels, and
- as a function of the rpm quantities, difference quantities are generated which represent the rpm and/or rotational speed differences at the outputs of the differentials, and
- the difference quantities are compared with specifiable threshold values, and
- the output torque of the internal combustion engine is adjusted in the sense of a reduction if at least one threshold value is exceeded.

A second variant of the present invention relates to a method and a device for adjusting the output speed of the internal combustion engine in a motor vehicle having at least four wheels that are arranged on at least two axles and that are driven by the internal combustion engine. In this context as well, at least one transverse differential is provided, which is assigned to an axle having driven wheels, and one center differential that is assigned to two axles having driven wheels. Then, in accordance with the invention,

- rpm quantities are measured that represent the rotational motions of the vehicle wheels, and
- as a function of the rpm quantities, difference quantities are generated which represent the rpm and/or rotational speed differences at the outputs of the differentials, and
- the difference quantities are compared with specifiable threshold values, and
- the output speed of the internal combustion engine is limited to a specifiable value if at least one threshold value is exceeded.

The following is presented as background to the present invention:

"Normally," in the driven case, the locking system described above, by an active wheel-specific braking (BMR), prevents excessive rpm differences at the outputs of the differentials. However, there exists a series of possibilities that lead to a deactivation of the braking torque control system (BMR):

- In the driven case, the driver intentionally brakes, for example in an off-road setting, or he does so unintentionally (a "two-footed" driver).
- The braking torque control system (BMR) on one wheel can be deactivated due to a supposed overheating of the wheel brake.
- Similarly, a faulty braking action on a specific wheel, for example as a result of a defective wheel brake, can lead to the BMR becoming inoperative.

In addition to the braking torque control system (BMR), a drive torque control system (AMR) can also be provided, which adjusts the drive torque effective on the wheels such that no excessive drive slip can arise. The drive torque control system (AMR) can be deactivated, for example by the driver. For instance, this can take place when the driver switches off a driving stability control system.

The wheel-specific control system (BMR) for the braking action on the wheels can therefore be deactivated if a braking process triggered by the driver is occurring and/or the measured temperature of at least one wheel brake unit exceeds a specifiable threshold value and/or the driver manually switches off the control system.

According to the present invention, the problem described above is solved by the rpm differences being calculated and monitored through evaluating the wheel speeds. If a limiting value is exceeded, then the engine torque, or the engine speed, is reduced or limited by a regulator, so that no damage can occur to the vehicle. In this way, it is also possible to effectively deal with faulty operation on the part of the driver.

In one advantageous refinement of the present invention in the first variant, it is provided that when at least one threshold value is established as having been exceeded, the above-mentioned control system (AMR) for the output torque of the internal combustion engine is activated, the system acting in the driven case. As a result, it is assured that no excessive drive slip arises on the wheels.

In one advantageous embodiment of the present invention in the second variant, it is provided that the limiting value, to which the engine output speed is limited, is stipulated as a function of the differential whose difference quantity exceeds the specifiable threshold value.

Generally speaking, a manual or automatic transmission is arranged downstream of the internal combustion engine. In the second variant of the present invention, it can be provided that the limiting value, to which the engine output speed is limited, is stipulated as a function of the currently set speed ratio of the transmission.

Further advantageous embodiments can be found in the subclaims.

DRAWING

FIG. 1 depicts an overview block diagram of the present invention, whereas in

EXEMPLARY EMBODIMENT

The present invention is described below on the basis of exemplary embodiments.

Figure 1:
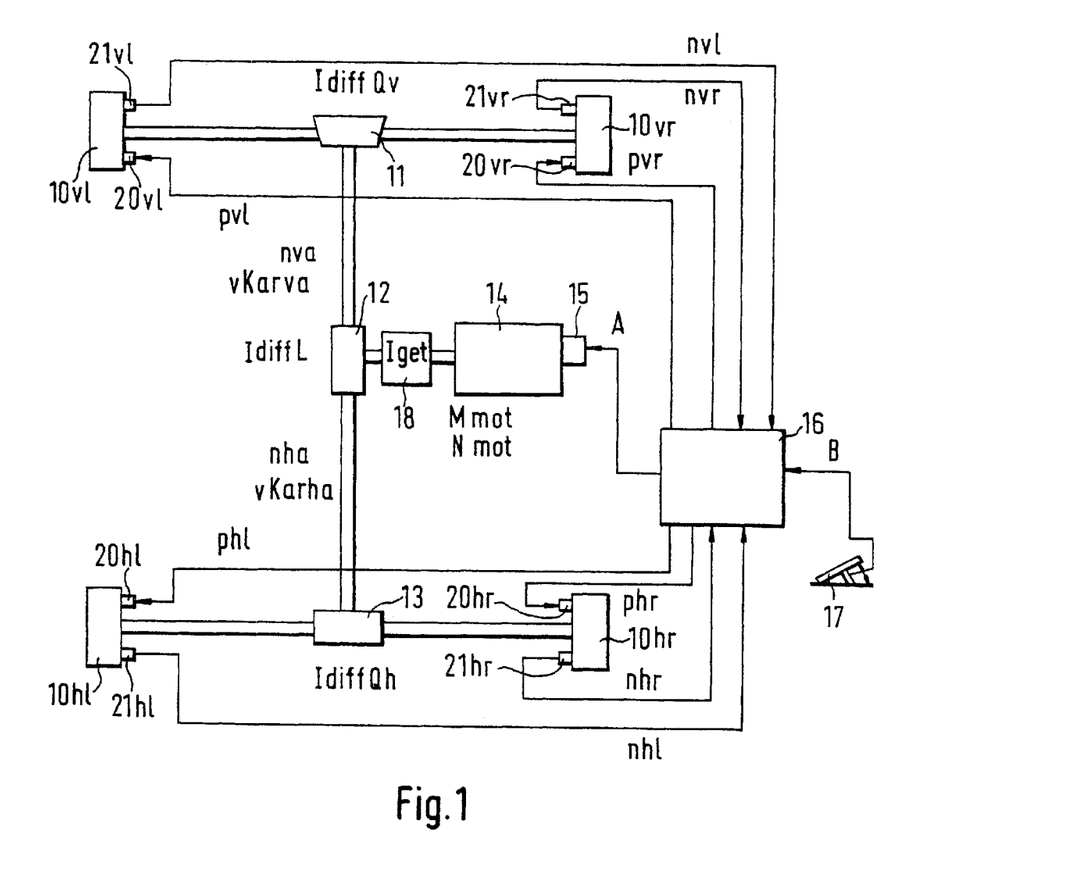

FIG. 1 schematically depicts a four-wheel-drive vehicle, the four wheels being designated using reference numerals $10ij$. In this context, index I designates the association of the wheel to the front axle (v) or to the rear axle (h). Index j indicates whether the wheel in question is located on the right (r) or on the left (l) side of the vehicle.

Assigned to wheels $10ij$ are wheel brake units $20ij$, which are driven by signals pij for carrying out a specific braking action, as well as wheel speed sensors $21ij$ for measuring wheel speeds nij.

Between the wheels of one axle, in each case, a transverse differential 11 and 13 is arranged, and between the axles a center differential 12. From engine 14, engine output torque Mmot, or engine output speed Nmot, is transmitted via manual or automatic transmission 18 to the input of center differential 12.

The engine is controlled by engine control system 15. This control system in particular relates to adjusting engine output torque Mmot, or engine output speed Nmot. For this purpose, engine control system 15 is driven by signal A from evaluation unit 16.

Signal B, indicating the actuation of brake pedal 17, is conveyed to evaluation unit 16. Also conveyed to evaluation unit 16 are wheel speeds nij. Among other things, evaluation unit 16 drives wheel brake units $20ij$ using signals pij.

Figure 2A:
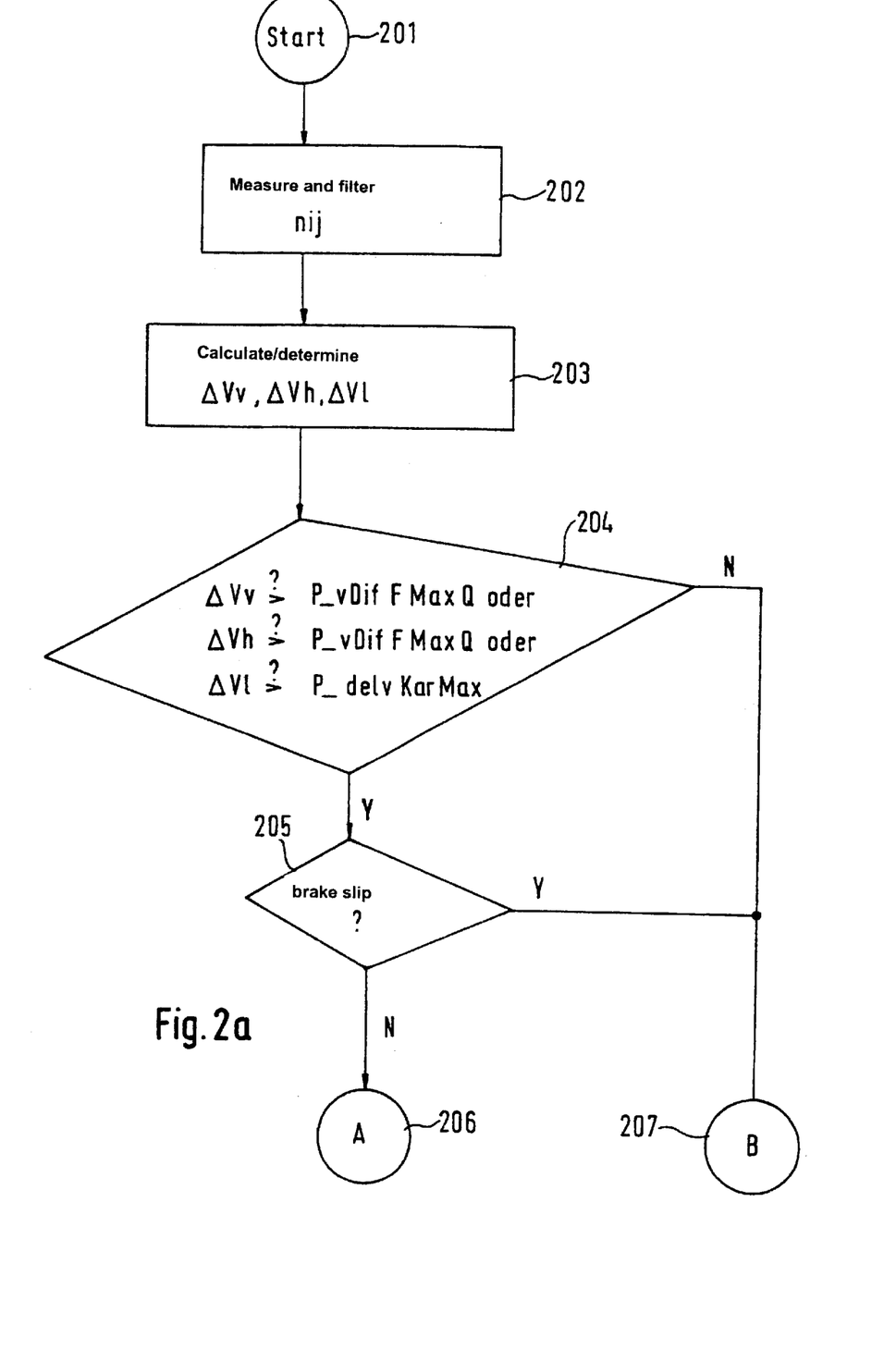
FIGS. 2a and 2b the first variant of the present invention is depicted, and in FIGS. 2a and 2c the second variant of the present invention is depicted on the basis of a flow chart.

The exemplary embodiments are discussed on the basis of FIG. 2a.

After starting step 201, in step 202, wheel speeds nij are measured and filtered, for example using a $PT_1$ element.

In step 203, the amounts for the rpm differences for the front and rear axles are measured:

$$\Delta Vv = \Delta nv \, (\pi*Rrad)/30 = |nvr - nvl| (\pi*Rrad)/30$$

$$\Delta Vh = \Delta nh \, (\pi*Rrad)/30 = |nhr - nhl| (\pi*Rrad)/30$$

In this context, the wheel radius is designated as Rrad.

In addition, the amount of difference $\Delta nl$ of the Cardan speeds vkarva and vkarha is measured on the front and rear axle as the speed difference in the longitudinal direction:

$$vkarva = nkarva*(\pi*Rrad)/30 = [(nvr+nvl)/2]*[(\pi*Rrad)/30]$$

$$vkarha = nkarha*(\pi*Rrad)/30 = [(nhr+nhl)/2]*[(\pi*Rrad)/30] \Delta Vl = |vkarva - vkarha|$$

The quantities $\Delta Vv$, $\Delta Vh$, and $\Delta Vl$ represent a measure for the load of individual differentials 11, 12, and 13.

In step 204, quantities $\Delta Vv$, $\Delta Vh$, and $\Delta Vl$ are compared to permissible limiting values P_vDifFMaxQ or P_delvKarMax. If the limiting values are not exceeded, then the process moves directly via step 207 to final step 209b/c.

However, if a limiting value is reached or exceeded as a result of excessive drive slip values, then the process proceeds to step 205.

In step 205, a check is carried out as to whether quantities $\Delta Vv$, $\Delta Vh$, and $\Delta Vl$ are arising as a result of rpm differences occurring as a result of brake slip. Differences caused by brake slip are not supposed to cause any triggering of the differential protection.

Figure 2B:
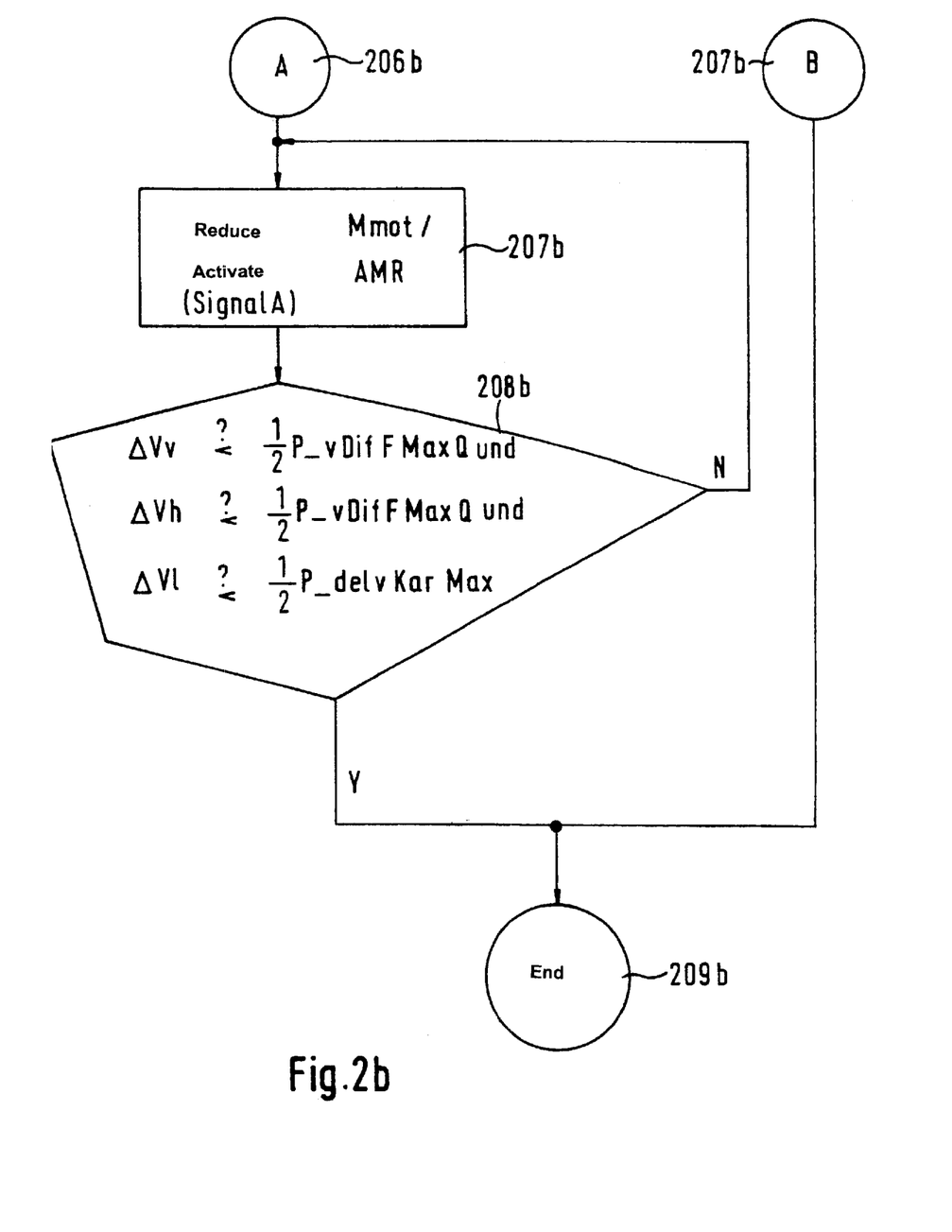

In the first variant, which is depicted in FIG. 2b, when at least one limiting value P_vDifFMaxQ or P_delvKarMax is exceeded, in step 207b the drive torque control system is activated in each case by signal A (FIG. 1), so that, by a withdrawal of or reduction in drive torque Mmot, a reduction of the engine speed and therefore a reduction of the rpm differences of the differential in question is achieved.

Especially in vehicles that are already equipped with a drive torque control system AMR for improving driving stability, it is sufficient to activate it, because the usual setpoint wheel speeds maintained in the context of the AMR lie significantly below the mechanical speed difference limiting values.

The reduction of the engine torque for the purpose of differential protection is ended as soon as limiting values P_vDifFMaxQ or P_delvKarMax are not exceeded for the permissible rpm differences. For this purpose, in step 208b, quantities $\Delta Vv$, $\Delta Vh$, and $\Delta Vl$ are compared with threshold values P_vDifFMaxQ/2 or P_delvKarMax/2.

After final step 209b, the sequence depicted in FIG. 2 is run through once again.

Figure 2C:
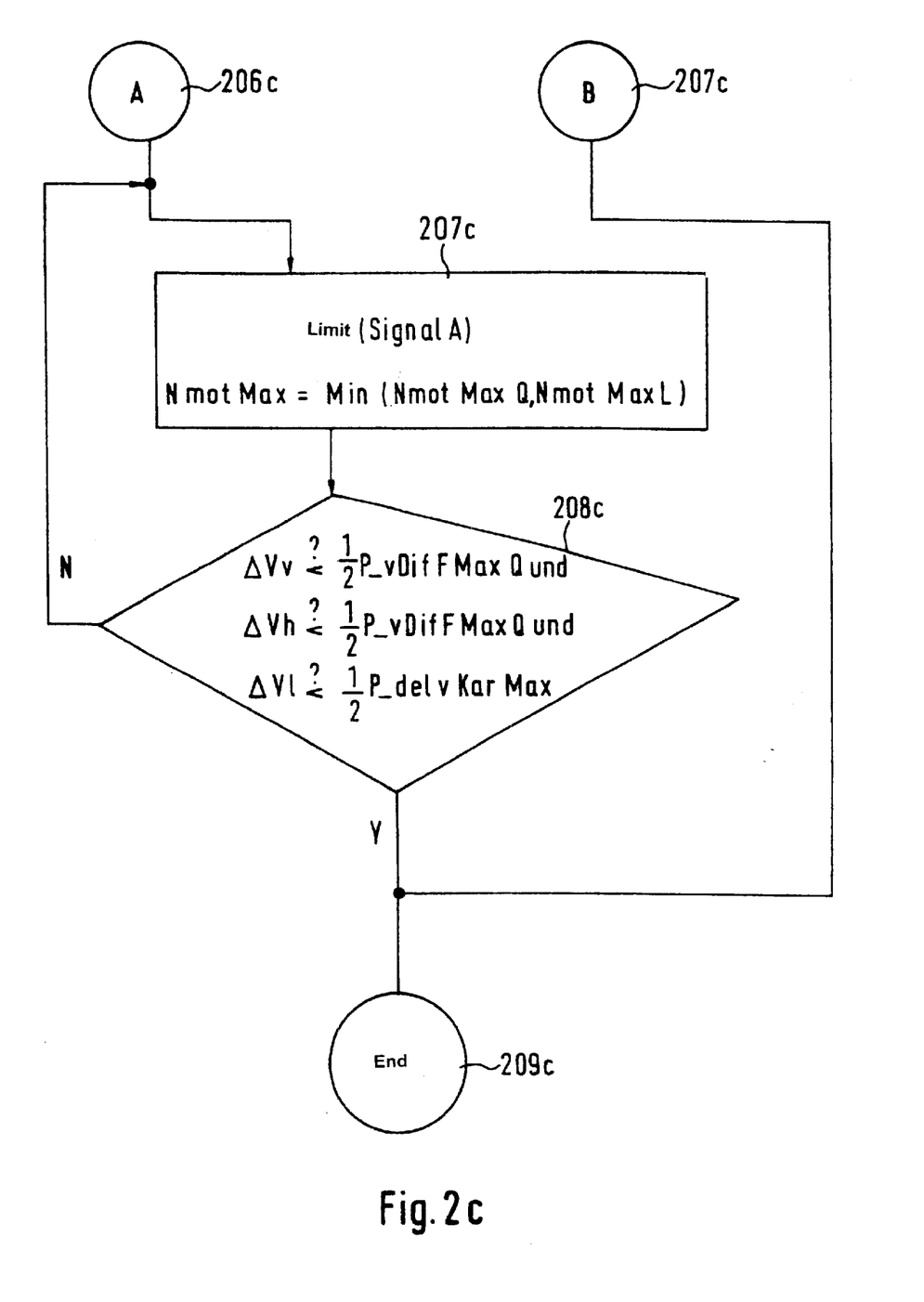

Alternatively, in the second variant depicted in FIG. 2c, using a subordinate speed control system, a limiting of engine speed Nmot to uncritical values can be carried out. This is always possible, even in vehicles which have not yet been equipped with a drive slip control system.

Nevertheless, the possibility of reducing the engine torque using at least one of the known methods must exist. For this purpose, one can have recourse to, for example, an electrically adjustable throttle valve (EGAS), injection limiting, or ignition angle adjustment.

Between wheel speeds nij and engine speed Nmot there exists the following ratio in a vehicle (without off-road reduction of the gear ratio) having open differentials:

$$nvl+nvr+nhl+nhr=4*Nmot/Iges \quad (1)$$

For overall ratio Iges, the following applies:

$$Iges=Iget*IdiffL*IdiffQ \quad (2)$$

Iget: ratio of the specific gear of transmission 18.
IdiffL: ratio of differential 12 in the longitudinal direction.
IdiffQ: ratio of differentials 11 and 13 in the transverse direction.

For the front axle and for the rear axle, this yields:

$$nvl+nvr=4*Nmot/Iges-nhl-nhr. \quad (3)$$

$$nhl+nhr=4*Nmot/Iges-nvl-nvr. \quad (4)$$

or $$nkritQva=4*Nmot/Iges-nhl-nhr-2*nvr. \quad (5)$$

$$nkritQha=4*Nmot/Iges-nvl-nvr-2*nhr. \quad (6)$$

where nkritQva=nvl−nvr: maximum permissible rpm difference at the front axle.

nkritQha=nhl−nhr: maximum permissible rpm difference at the rear axle.

Assuming, in the worst case for the differentials, that three wheels are at a standstill and one single wheel rotates freely, then in (5) or (6) the following ratio applies:

$$nkritQva=4*Nmot/Iges \text{ where } (nvr=nhl=nhr=0) \quad (7)$$

$$nkritQha=4*Nmot/Iges \text{ where } (nhr=nvl=nvr=0) \quad (8)$$

If the critical rpm difference in transverse direction nkritQ is expressed as wheel speed difference (P_vDifFMaxQ) in accordance with equation (7) and (8), the result is:

$$P\_vDifFMaxQ=nkritQ*\pi/30*Rrad \quad (9)$$

where Rrad=wheel radius.

Therefore, if it is established in step 204 that one of quantities ΔVv and ΔVh exceeds permissible wheel speed difference P_vDifFMaxQ, then in step 207c engine speed Nmot is limited to limiting value NmotMaxQ by a subordinate speed regulator or drive torque control system AMR:

$$NmotMaxQ=nkrit*Iges/4. \quad (10)$$

In this context also, a check is carried out in step 205 as to whether the rpm differences came about as a result of brake slip. Differences caused by brake slip are not supposed to trigger the differential protection system.

As was mentioned, in a four-wheel-drive vehicle, center differential 12, providing for the necessary speed compensation in the longitudinal direction between the front and rear axles, must be protected from excessive rpm differences.

For the axle drives, the following speeds apply:

$$nva=|diffQv*(nvl+nvr)/2. \quad (11)$$

$$nha=IdiffQh*(nhl+nhr)/2. \quad (12)$$

For the average wheel speed of the specific axle, the result is:

$$nKarva=(\pi*Rrad/30)*(nvl+nvr)/2 \quad (13)$$

$$nKarha=(\pi*Rrad/30)*(nhl+nhr)/2 \quad (14)$$

For the maximum permissible rpm difference in the longitudinal direction, nkritL applies:

$$nkritL=|nva-nha| \quad (15)$$

or, on the basis of equations (11) through (15):

$$nkritL=IdiffQ*(30/(\pi*Rrad))*|vKarva-vKarha| \quad (16)$$

For the difference of Cardan speeds delvKar, the following applies:

$$delvKar=|vKarva-vKarha| \quad (17)$$

and for the permissible limiting value:

$$P\_delvKarMax=nkritL*IdiffQ*(\pi*Rrad/30) \quad (18)$$

If it is established in step 204 that the permissible difference of Cardan speeds P_delvKarMax is exceeded, then engine speed Nmot must be limited to limiting value NmotMaxL using a subordinate speed regulator:

$$NmotMaxL=nkritL*Iget*IdiffL/4. \quad (19)$$

In a four-wheel-drive vehicle having transverse and center differentials, engine speed Nmot is therefore limited in step 207c to the value $$NmotMax=Min (NmotMaxQ, NmotMaxL) \quad (20).$$

This takes place by an appropriate transmission of signal A (FIG. 1).

The reduction of the engine torque for the purpose of protecting the differential is ended as soon as limiting values P_vDifFMaxQ and P_delvKarMax are clearly exceeded for the permissible rpm differences. For this purpose, in step 208c, quantities ΔVv, ΔVh, and ΔVl are compared with threshold values P_vDifFMaxQ/2 and P_delvKarMax/2.

After the final step 209c, the sequence depicted in FIG. 2 is run through once again.

In the sequence depicted in FIG. 2, a time query can also be provided. The measures of steps 207b and 207c are only introduced if the exceeding of a threshold value, established in step 204, has existed for a sufficiently long time.

In conclusion, it should be noted that the crux and advantage of the present invention lies in calculating and monitoring the rpm differences or the rpm differences in the transverse direction of any vehicle (front-wheel-, rear-wheel-, and four-wheel-drive) as well as the difference of the Cardan speeds that is also present in the longitudinal direction in a four-wheel-drive vehicle. When a specific limiting value is exceeded, an automatic reduction in the drive torque, or an automatic limiting of the engine speed to a viable level, takes place.

This protective function for the differentials cannot be switched off and is also available in passively switched drive torque AMR control systems. It can be realized only through software by exploiting already existing sensors and actuator devices. The application cost is minimal.

What is claimed is:

1. A method for adjusting an output torque of an internal combustion engine in a motor vehicle including at least four wheels arranged on at least two axles and driven by the internal combustion engine, the motor vehicle including a plurality of differentials including at least one transverse differential assigned to one of the at least two axles associated with driven ones of the at least four wheels, the motor vehicle including a center differential of the plurality of differentials assigned to two of the at least two axles having the driven wheels, the motor vehicle including at least one of a wheel-specific control system that is deactivatable for a driven case of the motor vehicle and for a braking action on the at least four wheels, a control system for the output torque of the internal combustion engine, and a control system for the output torque of the internal combustion engine, in the wheel-specific control system for the braking action when deactivated, the method comprising the steps of:

measuring rpm quantities that represent rotational motions of the at least four wheels;

generating a plurality of difference quantities as a function of the rpm quantities, the difference quantities representing at least one of an rpm and rotational speed differences at outputs of the differentials;

comparing the difference quantities with specifiable threshold values; and adjusting the output torque of the internal combustion engine in accordance with a reduction if at least one of the specifiable threshold values is exceeded.

2. A method for adjusting an output torque of an internal combustion engine in a motor vehicle including at least four wheels arranged on at least two axles and driven by the internal combustion engine, the motor vehicle having a plurality of differentials including at least one transverse differential assigned to one of the at least two axles including driven ones of the at least four wheels, the motor vehicle including a center differential of the plurality of differentials assigned to two of the at least two axles having the driven wheels, the method comprising the steps of:

measuring rpm quantities that represent rotational motions of the at least four wheels;

generating a plurality of difference quantities as a function of the rpm quantities, the difference quantities representing at least one of an rpm and rotational speed differences at outputs of the differentials;

comparing the difference quantities with specifiable threshold values; and limiting the output torque of the internal combustion engine to a specifiable limiting value if at least one of the specifiable threshold values is exceeded.

3. The method according to claim 1, further comprising the step of:

when at least one of the specifiable threshold values is exceeded, activating the control system for the output torque of the internal combustion engine, the control system for the output torque of the internal combustion engine acting in the driven case.

4. The method according to claim 2, wherein:

the specifiable limiting value is a function of the differential whose difference quantity exceeds one of the specifiable threshold values.

5. The method according to claim 2, further comprising the step of:

subordinating a transmission to the internal combustion engine, wherein:

the specifiable limiting value is a function of a currently set speed ratio of the transmission.

6. The method according to claim 1, further comprising the step of deactivating the wheel-specific control system for the braking action on the at least four wheels if at least one of the following occurs:

a braking process triggered by a driver is occurring, a measured temperature of at least one wheel braking unit exceeds one of the specifiable threshold values, and the driver manually switches off the wheel-specific control system.

7. A device for adjusting an output torque of an internal combustion engine in a motor vehicle including at least four wheels arranged on at least two axles and driven by the internal combustion engine, the motor vehicle including a plurality of differentials including at least one transverse differential assigned to one of the at least two axles associated with driven ones of the at least four wheels, the motor vehicle including a center differential of the plurality of differentials assigned to two of the at least two axles having the driven wheels, the motor vehicle including at least one of a wheel-specific-,control system that is deactivatable for a driven case of the motor vehicle and for a braking action on the at least four wheels, a control system for the output torque of the internal combustion engine, and a control system for the output torque of the internal combustion engine, in the wheel-specific control system for the braking action when deactivated, the device comprising:

an arrangement for measuring rpm quantities that represent rotational motions of the at least four wheels;

an arrangement for generating a plurality of difference quantities as a function of the rpm quantities, the difference quantities representing at least one of an rpm and rotational speed differences at outputs of the differentials;

an arrangement for comparing the difference quantities with specifiable threshold values; and an arrangement for adjusting the output torque of the internal combustion engine in accordance with a reduction if at least one of the specifiable threshold values is exceeded.

8. A device for adjusting an output torque of an internal combustion engine in a motor vehicle including at least four wheels arranged on at least two axles and driven by the internal combustion engine, the motor vehicle having a plurality of differentials including at least one transverse differential assigned to one of the at least two axles including driven ones of the at least four wheels, the motor vehicle including a center differential of the plurality of differentials assigned to two of the at least two axles having the driven wheels, the device comprising:

an arrangement for measuring rpm quantities that represent rotational motions of the at least four wheels;

an arrangement for generating a plurality of difference quantities as a function of the rpm quantities, the difference quantities representing at least one of an rpm and rotational speed differences at outputs of the differentials;

an arrangement for comparing the difference quantities with specifiable threshold values; and an arrangement for limiting the output torque of the internal combustion engine to a specifiable limiting value if at least one of the specifiable threshold values is exceeded.

9. The device according to claim 7, wherein:

when at least one of the specifiable threshold values is exceeded, the control system for the output torque of the internal combustion engine is activated, the control system for the output torque of the internal combustion engine acting in the driven case.

10. The device according to claim 8, wherein:

the specifiable limiting value is stipulated as a function of the differential whose difference quantity exceeds one of the specifiable threshold values.

11. The device according to claim 8, further comprising:
a transmission arranged subordinate to the internal combustion engine, wherein:
   the specifiable limiting value is stipulated as a function of a currently set speed ratio of the transmission.

12. The device according to claim 7, wherein:
the wheel-specific control system for the braking action on the at least four wheels is deactivated if at least one of the following occurs:

a braking process triggered by a driver is occurring, a measured temperature of at least one wheel braking unit exceeds another specifiable threshold values, and the driver manually switches off the wheel-specific control system.

* * * * *

UNITED STATES PATENT AND TRADEMARK OFFICE
CERTIFICATE OF CORRECTION

PATENT NO.  : 6,493,622 B1 Page 1 of 1
DATED       : December 10, 2002
INVENTOR(S) : Andreas Erban It is certified that error appears in the above-identified patent and that said Letters Patent is hereby corrected as shown below:

Column 1,
Line 5, change "BACKGROUND INFORMATION" to -- FIELD OF THE INVENTION --.
Lines 8-9, delete ",having the features of the preamble of the independent claims".
Line 64, insert -- SUMMARY OF THE INVENTION --.
Line 65, change "The objective" to -- An object --.
Line 67, change "means" to -- expedients --.

Column 2,
Lines 1-2, delete "This objective is achieved by the characterizing features of the independent claims."
Line 4, delete "ADVANTAGES OF THE INVENTION".
Line 39, change "the invention." to -- the present invention. --

Column 3,
Lines 39-40 delete "Further advantageous embodiments can be found in the subclaims."
Line 42, change "DRAWING" to -- BRIEF DESCRIPTION OF THE DRAWINGS --.
Delete lines 46-48, and insert -- Figure 1 depicts an overview block diagram of the present invention.
Figure 2a illustrates a flow chart applicable to first and second variants of the present invention.
Figure 2b illustrates a flow chart applicable to the first variant of the present invention.
Figure 2c illustrates a flow chart applicable to the second variant of the present invention. --
Line 49, change "EXEMPLARY EMBODIMENT" to -- DETAILED DESCRIPTION --.

Column 5,
Line 60, delete "necessary".

Signed and Sealed this

Second Day of December, 2003

JAMES E. ROGAN
*Director of the United States Patent and Trademark Office*